Oct. 15, 1968 R. G. DEXTER 3,405,499

TORQUE LIMITING APPARATUS

Filed Aug. 23, 1966 3 Sheets-Sheet 1

INVENTOR.
ROBERT G. DEXTER
BY
Brown, Critchlow, Flick & Peckham
ATTORNEYS.

Oct. 15, 1968 R. G. DEXTER 3,405,499
TORQUE LIMITING APPARATUS
Filed Aug. 23, 1966 3 Sheets-Sheet 2
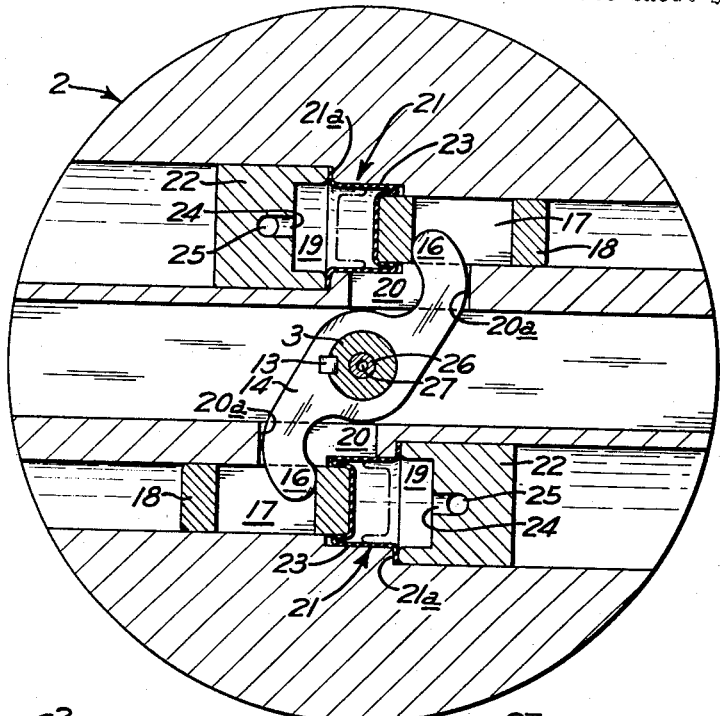
Fig. 2
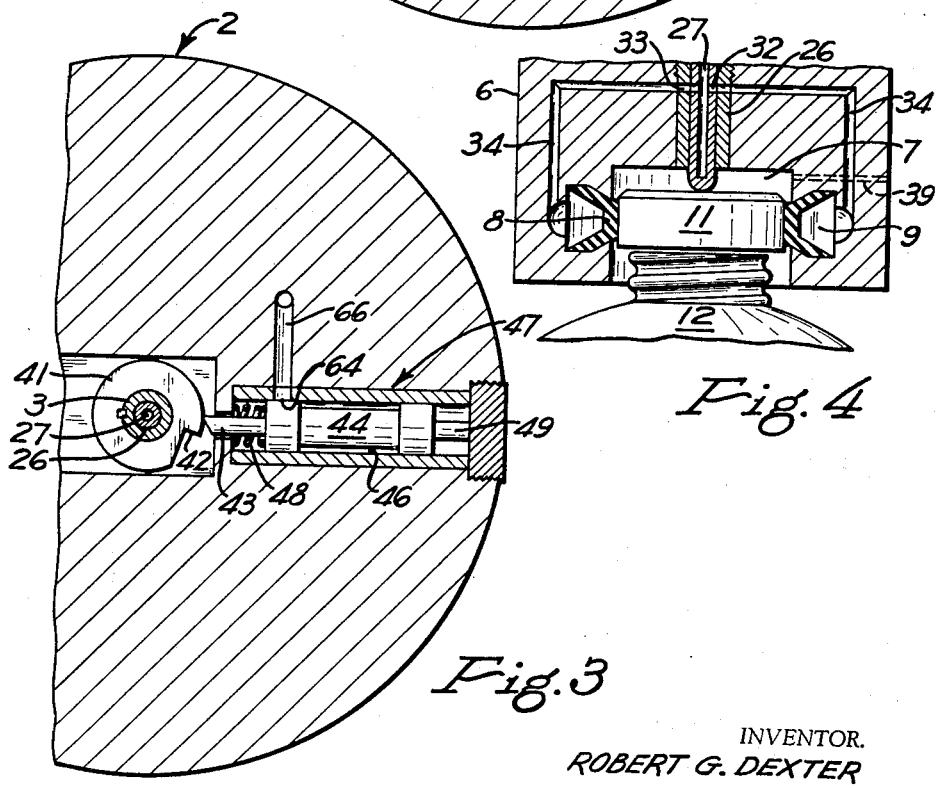
Fig. 3
Fig. 4
INVENTOR.
ROBERT G. DEXTER
BY
Brown, Critchlow, Flick & Peckham
ATTORNEYS.

Oct. 15, 1968   R. G DEXTER   3,405,499
TORQUE LIMITING APPARATUS
Filed Aug. 23, 1966   3 Sheets-Sheet 3

INVENTOR.
ROBERT G. DEXTER
BY
Brown, Critchlow, Flick & Peckham
ATTORNEYS.

United States Patent Office 3,405,499
Patented Oct. 15, 1968

3,405,499
TORQUE LIMITING APPARATUS
Robert G. Dexter, Lunenburg, Mass., assignor, by mesne assignments, to Horix Manufacturing Company, Pittsburgh, Pa., a corporation of Pennsylvania
Filed Aug. 23, 1966, Ser. No. 574,325
8 Claims. (Cl. 53—331.5)

This invention relates to torque limiting apparatus and, more particularly, to apparatus for limiting the torque applied to caps while screwing them on containers.

It is among the objects of this invention to provide container capping apparatus in which the cap gripping element will grip a cap inserted into the element from below for screwing it onto a container and will release the cap upon the application thereto of a predetermined maximum torque that is measured without the use of springs and under conditions that are substantially free of friction to assure that all caps will be applied with a uniform torque.

In accordance with this invention, a downwardly opening chuck is supported on the lower end of a spindle that is rotatable about a vertical axis. Inside the chuck is a gripper. Actuating means cause the gripper to grip a cap in response to the insertion of the cap in the chuck from below and to release the cap in response to angular movement of the chuck relative to the spindle. Torque limiting means, operable in response to a predetermined fluid pressure, normally maintain the chuck in fixed angular relation to the spindle, so that a cap held by the gripper will be screwed on the container by rotation of the spindle. However, the same torque limiting means permit angular movement of the chuck relative to the spindle when the resistance of the cap to further rotation, reflecting the fact that it has been screwed on the container to the desired tightness, is sufficient to overcome said fluid pressure, thereby causing the gripper to release its hold on the cap.

A preferred embodiment of the invention is illustrated in the accompanying drawings, in which FIG. 1 is a view, partly in section, of a portion of the capping apparatus showing its general arrangement;

FIG. 2 is a plan view along the line II—II of FIG. 1;

FIG. 3 is a plan view along the line III—III of FIG. 1;

Figure 1:
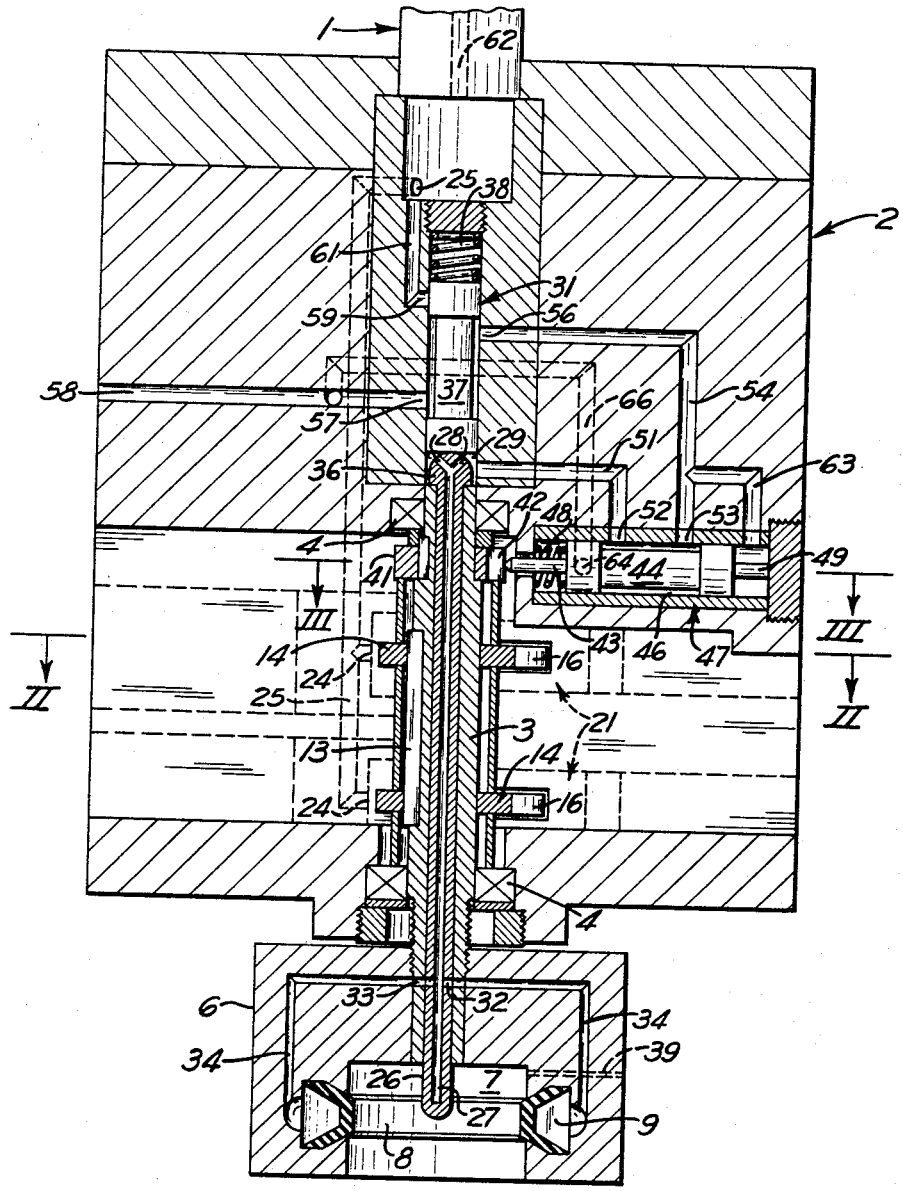
Figure 5:
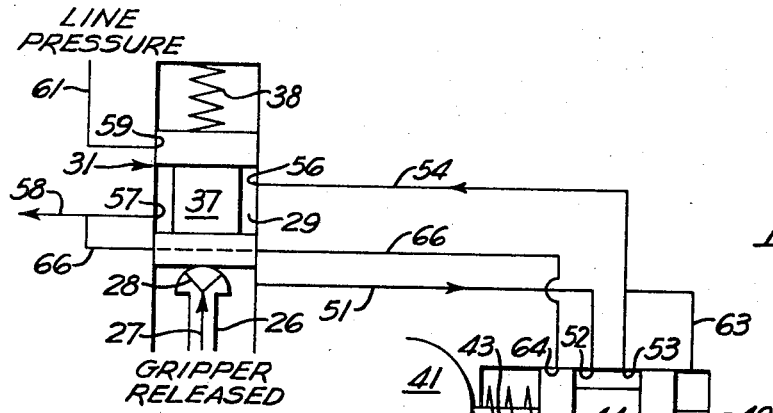
Figure 6:
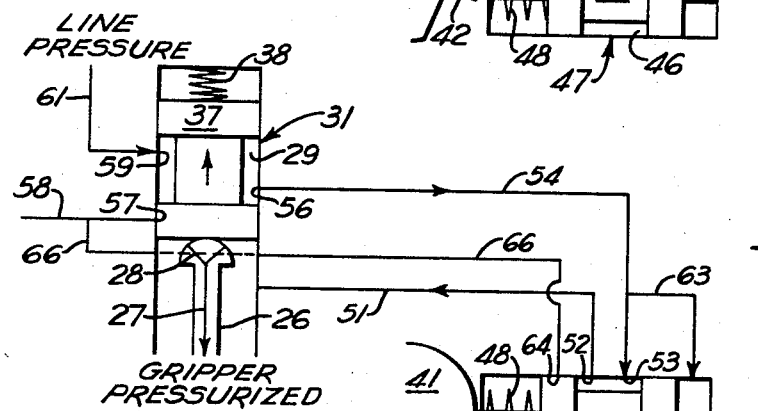
Figure 7:
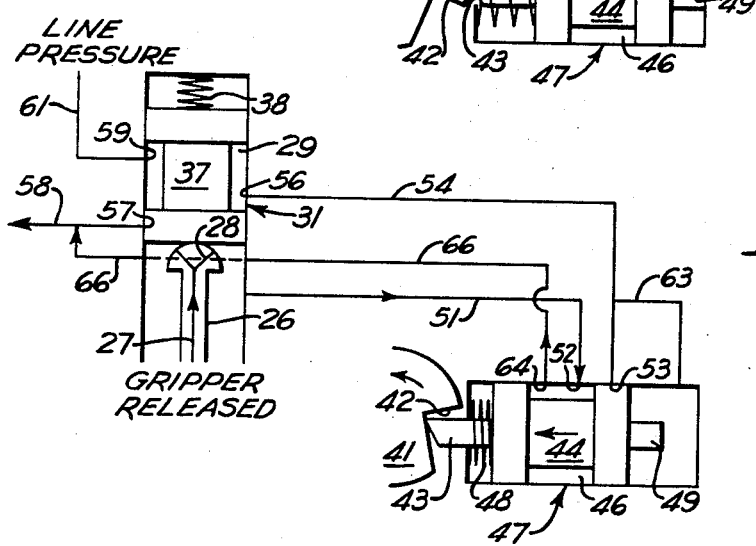

FIG. 4 is an elevation, partly in section and of reduced scale, of a portion of FIG. 1, showing a cap held in the chuck for screwing onto a container; and FIGS. 5, 6, and 7 are fragmentary diagrammatic views of a portion of the means for actuating the gripper in the chuck to grip a cap upon the insertion of a cap in the chuck and to release a cap upon the application thereto of a predetermined torque.

The capping apparatus disclosed herein can be used with a capping machine having a vertically movable, rotatable spindle. Such a machine is shown, for example, in the copending application of Charles V. Wilhere, Ser. No. 360,652, filed Apr. 17, 1964 and now Patent No. 3,309,838.

Referring to the drawings in the present application, the spindle is generally designated by the reference numeral 1; it can be rotated continuously as desired about its vertical axis and may be periodically lowered and raised in the manner disclosed in said copending application (or, alternatively, the cap and container can be raised and lowered). The lower end of the spindle has an enlarged head 2, which is partially hollowed out to provide space for the various elements described below. A sleeve 3 is rotatably supported inside and coaxial with the spindle head on bearings 4. On the lower end of the sleeve is mounted a chuck 6, provided with a downwardly opening recess 7. Inside the chuck and extending into the recess is a gripper 8 in the form of a molded rubber ring having a flat-bottom V-shaped cross section. This ring is held in an annular chamber 9, which has conformingly tapered walls and opens into the recess 7. Introduction of pressurized fluid into chamber 9 behind the ring, as described in more detail later herein, causes the flat bottom of the ring to protrude further into the recess to grip a cap 11 inserted in the chuck for screwing onto a container 12 (see FIG. 4).

Mounted on the sleeve 3, and keyed thereto by the key 13, are two vertically spaced S-shaped torque arms 14 which extend horizontally within a hollowed out portion of the spindle head. The torque arms have rounded ends 16, which are slidably received within slots 17 of pistons 18 (see FIG. 2). These pistons cooperate with their respective cylinders 19, which are subjected to internal fluid pressure, to maintain the sleeve 3 (and chuck 6 mounted thereon) in fixed angular relation to the spindle head 2. In this connection, the torque arms 14 are urged by the fluid pressure inside cylinders 19 to rotate clockwise (looking at FIG. 2) until they come to rest against edge 20a of slots 20 in the cylinder body. Although a number of piston and cylinder combinations can be used for this purpose, the form here illustrated are known as "Belloframs," which are commercially available from Bellofram Corporation, Burlington, Mass., and have the advantage of eliminating the costly fitting and the friction seals usually associated with piston-cylinder combinations. Each Bellofram 21 has a flanged end 21a, which is sealed against a shoulder of the cylinder by a recessed plug 22, and a flexible folded cylindrical portion 23. The closed end and partially folded side of the latter contact the end and side of the associated piston to provide the desired pressure on the piston. Normally, the Belloframs are held in their extended positions, as shown in solid lines in FIG. 2, by a predetermined fluid pressure inside the cylinder supplied through inlet ports 24 connected by passages 25 to a source (not shown) of fluid under pressure, preferably compressed air. In this way, rotation of the spindle is transmitted through the Bellofram cylinders and pistons and through torque arms 14 and sleeve 3 to chuck 6. Two torque arms 14 and four Bellofram units 21 are used, so that those units can be small enough to fit into a spindle head of reasonable size and can be operated at reasonably low fluid pressure to provide the desired maximum torque to the chuck.

Slidably mounted inside of sleeve 3 is a control rod 26 adapted to move upward in response to the insertion of a cap in the chuck from below (see FIG. 4). The control rod is provided with an axial passage 27, the lower end of which is closed and the bifurcated upper ends 28 of which open into a valve cylinder 29 of a control valve 31. The lower portion of passage 27 is connected by radial passages 32 in the control rod and by circumferential slots 33 in sleeve 3 with passages 34 in the chuck, and the latter passages in turn communicate with chamber 9. The upper end of the control rod is upset to provide a shouldered head 36 that normally rests on the upper end of sleeve 3 and supports the bottom of a double-ended valve piston 37 forming part of control valve 31. A coil spring 38 presses the piston and control rod downward, so that the lower end of the latter normally extends below the lower end of sleeve 3 and into the recess 7, where it can be engaged and forced upward by a cap inserted in the chuck from below. A vent passage 39 is preferably provided for recess 7, so that any air leakage from passage 32 between sleeve 3 and control rod 26 will not build up pressure inside that recess.

A cam 41 is keyed to sleeve 3 above the upper torque arm 14. As best shown in FIG. 3, the operative surface of this cam has a step 42, which normally holds a cam follower pin 43 in the position shown in FIGS. 1 and 3. Pin 43 is rigidly attached to a double-ended valve piston 44 supported in valve cylinder 46 of a latching valve 47. On counterclockwise rotation of cam 41 relative to the spindle head 2 (looking at FIG. 3), pin 43 and valve piston 44 move to the left under the urging of fluid pressure applied to the opposite end of the piston, as described in detail below. Normally, valve piston 44 is urged to the right (looking at FIG. 3) by a coil spring 48 until a stop pin 49 on the outer end of the piston engages the end wall of the valve cylinder 46 so that the piston is in the position shown in FIGS. 1 and 3.

The fluid means for actuating the gripper, first to grip and hold a cap that is inserted in the chuck from below and then to release the cap upon the application thereto of a predetermined torque, is shown in FIG. 1, and also shown in different positions diagrammatically in FIGS. 5–7.

Normally, gripper 8 is relaxed, with control rod 26 and control valve 31 and latching valve 47 all in the positions shown in FIGS. 1 and 5. Under these conditions, chamber 9 in chuck 6 is vented through passages 34, 33, 32, 27, 28, and 51, then through ports 52 and 53 of latching valve 47, passage 54, and ports 56 and 57 of control valve 31, and passage 58 to the outside atmosphere. When a cap 11 is introduced into the chuck from below, as when the spindle descends and the chuck receives a cap from a conventional cap transfer arm (not shown), the control rod 26 inside the chuck is pushed up (see FIG. 4) and raises piston 37 in control valve 31 against the pressure of spring 38. Piston 37 is then in the raised position shown in FIG. 6 and closes exhaust port 57 and opens port 59, which is connected by passages 61 and 62 with a source of pressurized air (not shown). Through port 56, passage 54, ports 53 and 52, and passages 51, 28, 27, 32, 33, and 34, chamber 9 will thereupon be pressurized to cause the gripper 8 to bulge inwardly and grip the cap firmly. It will be noted in FIG. 6 that line pressure from passage 62 is applied through a passage 63 to the outer end of valve piston 44 in latching valve 47, but that the piston cannot move to the left under the urging of that pressure because its cam follower pin 43 is held on the high step of cam 41.

Assuming that spindle 1 is rotating about a vertical axis in a clockwise direction (as viewed from above), its rotation will be transmitted through Bellofram units 21 and torque arms 14 to sleeve 3 and thence to chuck 6, which will rotate the cap to screw it on the container. When the torque applied to the cap has reached a predetermined maximum (i.e., when it is screwed on as tightly as is desired), as measured by the fluid pressure in the Bellofram units, then torque arms 14 will move counterclockwise (looking at FIG. 2) relative to the spindle head 2, causing the flexible portion 23 of the Bellofram cylinders to fold inward to the position shown in broken lines in FIG. 2. In other words, when the resistance of chuck 6 to a further increase in the applied torque becomes sufficient to overcome the fluid pressure in the Bellofram units, the resulting movement of the pistons 18 of those units and their associated torque arms 14 gives a counterclockwise twist to sleeve 3 and cam 41 (looking at FIG. 3) relative to the spindle head 2, so that the cam assumes the position shown in FIG. 7. Valve piston 44 is thereby unlatched, so that it will move to the left in FIG. 7 under the urging of fluid pressure from passage 63 on the outer end of the piston sufficient to compress spring 48. This movement of piston 44 closes port 53 and opens port 64 in latch valve 47 to disconnect the line pressure (through passage 62) from chamber 9 and to vent that chamber to the atmosphere through passages 51, 66, and 58. When so vented, the gripper relaxes its grip on the cap and releases it and the container to which it has been applied. When the spindle is thereafter raised (or the container lowered), the capped container will be withdrawn from the chuck in the usual manner. Control rod 26 and valve piston 37 will then return under the urging of spring 38 to their normal lowered positions shown in FIGS. 1 and 5. When that occurs, line pressure through passage 62 will be disconnected from the outer end of the latching valve piston 44 and the space adjacent that end will be vented through passages 63 and 54, ports 56 and 57, and passage 58, to permit the piston to return under the urging of its spring 48 to the position shown in FIGS. 1 and 5. Cam 41, which was previously locked by pin 43 in the position shown in FIG. 7, will thereupon return to its original position by the clockwise rotation (see FIG. 2) of torque arms 14 relative to the spindle head 2 under the urging of fluid pressure in the Bellofram units 21. The apparatus is then ready to begin another cycle.

It is among the advantages of the present invention that the torque applied by the spindle to the chuck for screwing a cap on a container, which is, of course, equal to and opposed by the resistance offered by the cap, is measured by fluid pressure means that are substantially free of friction or other mechanical variables and that will permit uniform torque application in capping a large number of containers. For example, by connecting a central source of fluid pressure to the torque limiting means associated with a plurality of chucks in one or more capping machines, all caps applied by those machines will be tightened uniformly on their containers. It will, of course, be understood that the central source of fluid pressure would normally be provided with a pressure reducing valve of conventional type (not shown herein) for adjustably regulating the line pressure in passage 62 to the amount desired on any given application. Generally, a line pressure suitable for such purpose is also sufficient to actuate the gripper to hold the cap tightly enough so that it will not slip before the desired torque limit is reached. However, if desired, a separate fluid pressure system can be used for the torque limiting means and for the gripper actuating means, with different fluid pressures in each system. Whether one or more fluid pressure systems are used, fluid under pressure would be introduced from a pressure reducing valve through a rotary joint on the turret shaft of rotary type capping machines and through similar joints on each capping spindle.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for applying a screw cap to a container, comprising a spindle rotatable about a vertical axis, a downwardly opening chuck depending from the lower end of the spindle, a gripper mounted inside the chuck, actuating means operable in response to the insertion of a cap in the chuck from below to cause the gripper to grip the cap and operable in response to angular movement of the chuck relative to the spindle to cause the gripper to release the cap, and torque limiting means operable in response to a predetermined fluid pressure for normally holding the chuck in fixed angular relation to the spindle for screwing the cap on the container by rotation of the spindle but permitting angular movement of the chuck relative to the spindle upon the application of a perdetermined torque to the chuck sufficient to overcome said fluid pressure.

2. Apparatus according to claim 1, in which the torque limiting means include a piston-cylinder combination having one element connected to the spindle and the other element connected to the chuck, and a source of fluid under pressure connected with the interior of the cylinder element for providing relative displacement in one direction between the cylinder and piston elements in response to a predetermined fluid pressure and in the other direction when the resistance of the chuck to rotation with the spindle is sufficient to overcome said predetermined fluid pressure.

3. Apparatus according to claim 1, in which the torque limiting means include a sleeve rotatably mounted in the spindle and rigidly connected to the chuck, a torque arm rigidly connected to the sleeve, and a fluid pressure responsive piston-cylinder combination with one element thereof connetced to the spindle and the other element to the torque arm.

4. Apparatus according to claim 3, in which the piston-cylinder combination is of the sealed diaphragm type with a portion of the cylinder wall being sufficiently flexible to permit relative displacement between the cylinder and piston elements.

5. Apparatus according to claim 2, in which a plurality of said piston-cylinder combinations are mounted symmetrically relative to the axis of the spindle.

6. Apparatus according to claim 1, in which the gripper is operative in response to fluid pressure, and in which the gripper actuating means include a source of fluid under pressure and valve means for controlling the fluid pressure applied to the gripper.

7. Apparatus according to claim 1, in which the gripper is operative in response to fluid pressure, and in which the actuating means include a source of such fluid, a pressure passage connecting said source with the gripper, a vent passage connecting the gripper with the ambient air, separate control and latching valves associated with both passages and adapted to assume first and second positions independently, said valves being operative when both are in their first positions, as well as when both are in their second positions, to disconnect the gripper from said source and to vent the gripper to the air and operative when the control valve is in its second position and the latching valve is in its first position to connect the gripper with said source, thereby to cause the gripper to grip a cap in the chuck for screwing it on a container, means normally urging said valves into their first positions, shifting means responsive to the insertion of a cap in the chuck from below to move the control valve from its first to its second position, means responsive to relative angular movement between the chuck and spindle when the control valve is in its second position to cause the latching valve to move from its first to its second position, and means for holding the latching valve in its second position until the control valve in response to the removal of a cap from the chuck moves from its second to its first position.

8. Apparatus according to claim 7, in which said shifting means include a control rod mounted for vertical reciprocation in the spindle with the lower end of the rod extending into the chuck and adapted to be displaced upwardly by the insertion of a cap into the chuck from below.

References Cited

UNITED STATES PATENTS

| | | | |
|---|---|---|---|
| 2,684,141 | 7/1954 | Pim | 53—317 X |
| 2,884,751 | 5/1959 | Bjering | 53—317 |
| 3,255,568 | 6/1966 | Martin et al. | 53—331.5 X |

TRAVIS S. McGEHEE, *Primary Examiner.*

R. L. FARRIS, *Assistant Examiner.*